United States Patent [19]

Campos et al.

[11] 4,192,634

[45] Mar. 11, 1980

[54] ROTARY INTERNAL COMBUSTION ENGINE

[75] Inventors: Adolph A. Campos; Joseph V. Michele, both of Nutley, N.J.

[73] Assignee: Campos Associates

[21] Appl. No.: 854,290

[22] Filed: Nov. 23, 1977

Related U.S. Application Data

[63] Continuation-in-part of Ser. No. 749,642, Dec. 10, 1976, Pat. No. 4,120,620.

[51] Int. Cl.² .............. F01C 1/02; F01C 17/02; F01C 21/04
[52] U.S. Cl. ................... 418/61 A; 418/89; 418/91; 418/182
[58] Field of Search ............ 418/61 A, 83, 91, 182, 418/89, 93, 94; 123/242

[56] References Cited

U.S. PATENT DOCUMENTS

| 813,018 | 2/1906 | Okun | 418/182 |
|---|---|---|---|
| 3,054,357 | 9/1962 | McGill | 418/182 |
| 3,173,406 | 3/1965 | Campos | 418/61 A |
| 3,206,108 | 9/1965 | Abermeth | 418/91 |
| 3,213,837 | 10/1965 | Keylwert | 418/91 |
| 3,261,334 | 7/1966 | Paschke | 418/91 |
| 3,923,434 | 12/1975 | Walters | 418/91 |
| 4,120,620 | 10/1978 | Campos et al. | 418/61 A |

FOREIGN PATENT DOCUMENTS

1551124 1/1970 Fed. Rep. of Germany ........ 418/61 A

*Primary Examiner*—John J. Vrablik
*Attorney, Agent, or Firm*—Richard T. Laughlin

[57] ABSTRACT

This invention relates to a rotary internal combustion engine operating on the four-stroke cycle: intake, compression, combustion and exhaust and the utilization of a star-shaped eccentric for converting the rotation of the rotor to driving the mainshaft, and an associated carburetor.

1 Claim, 11 Drawing Figures

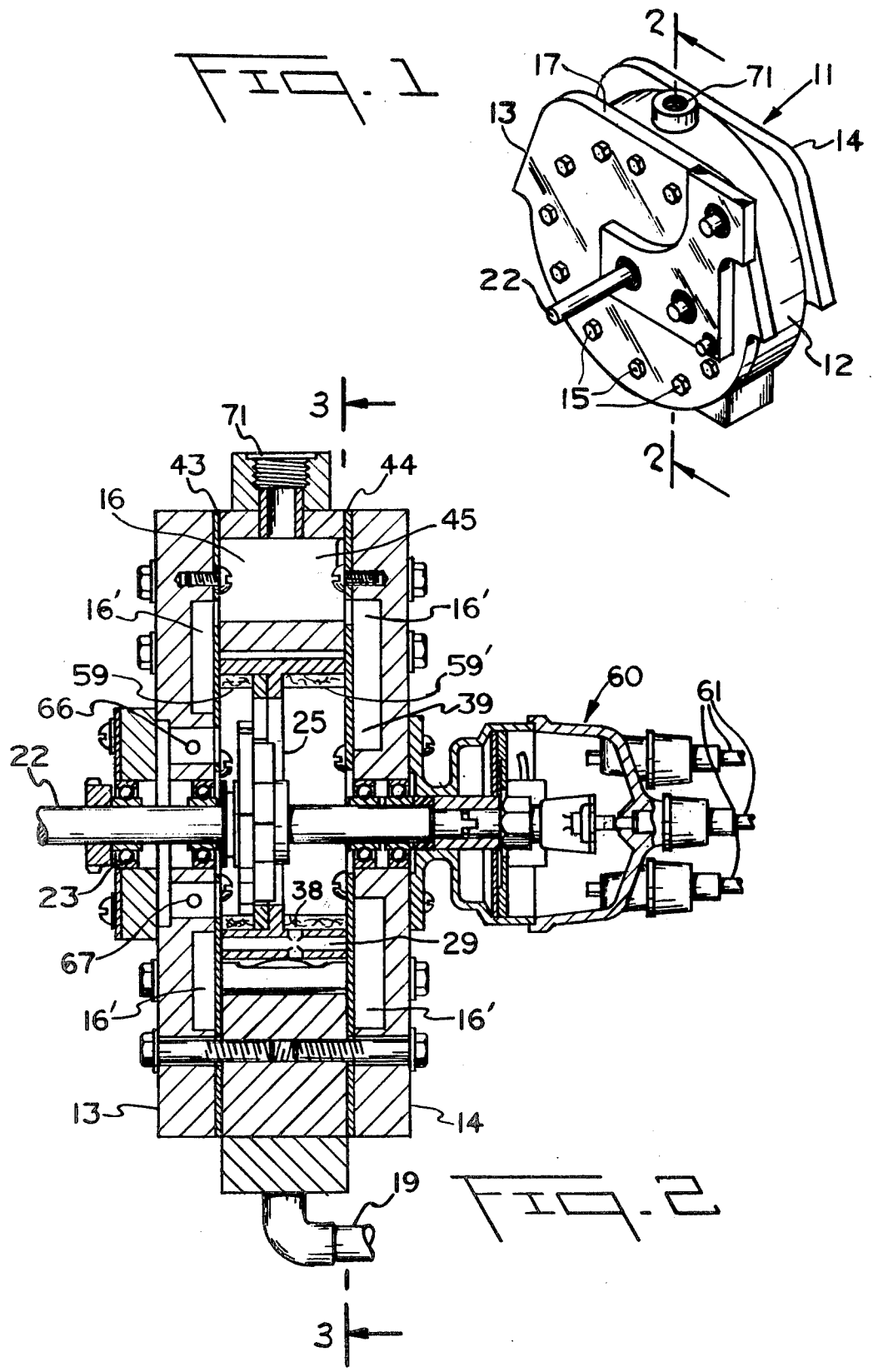

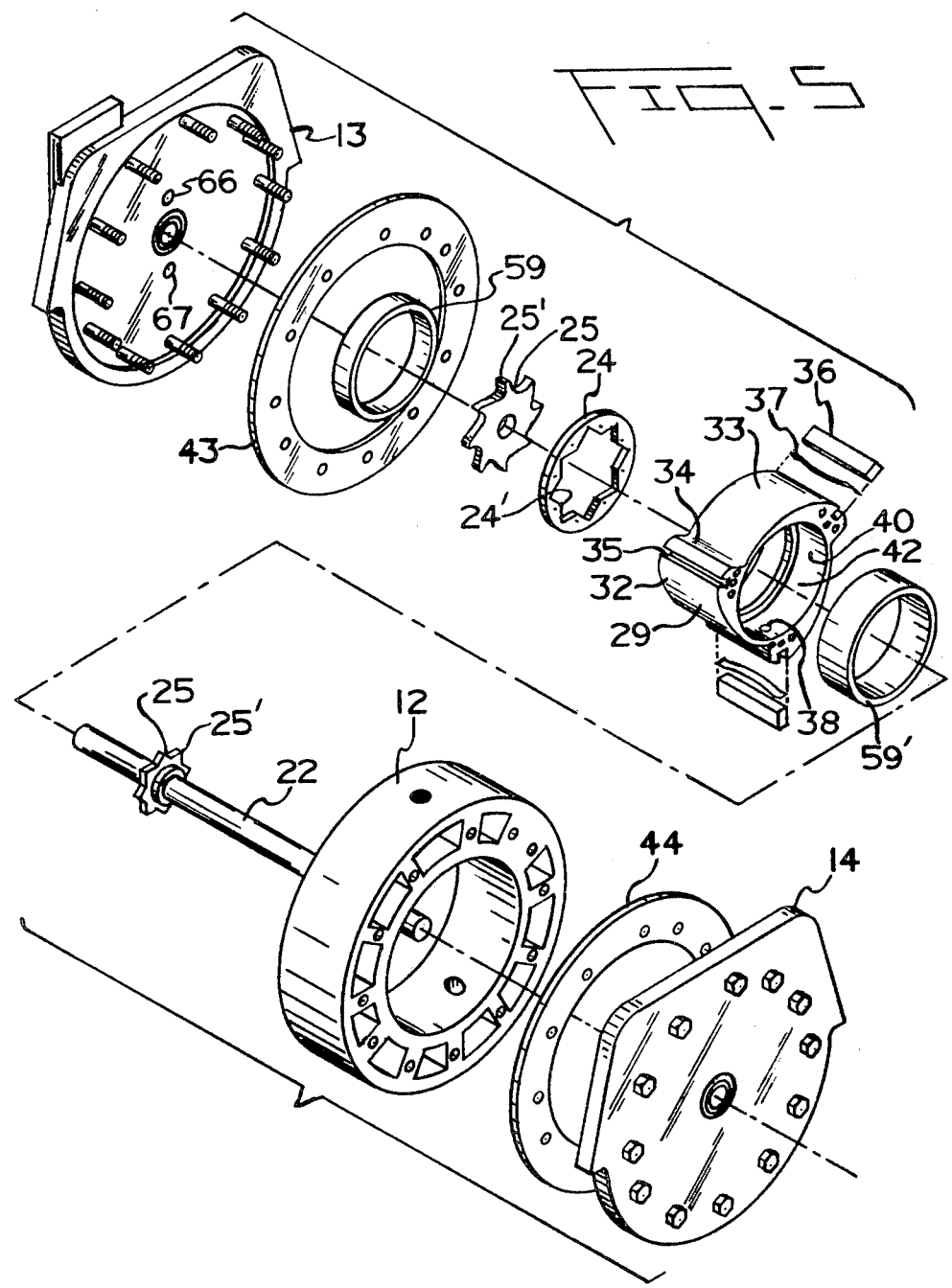

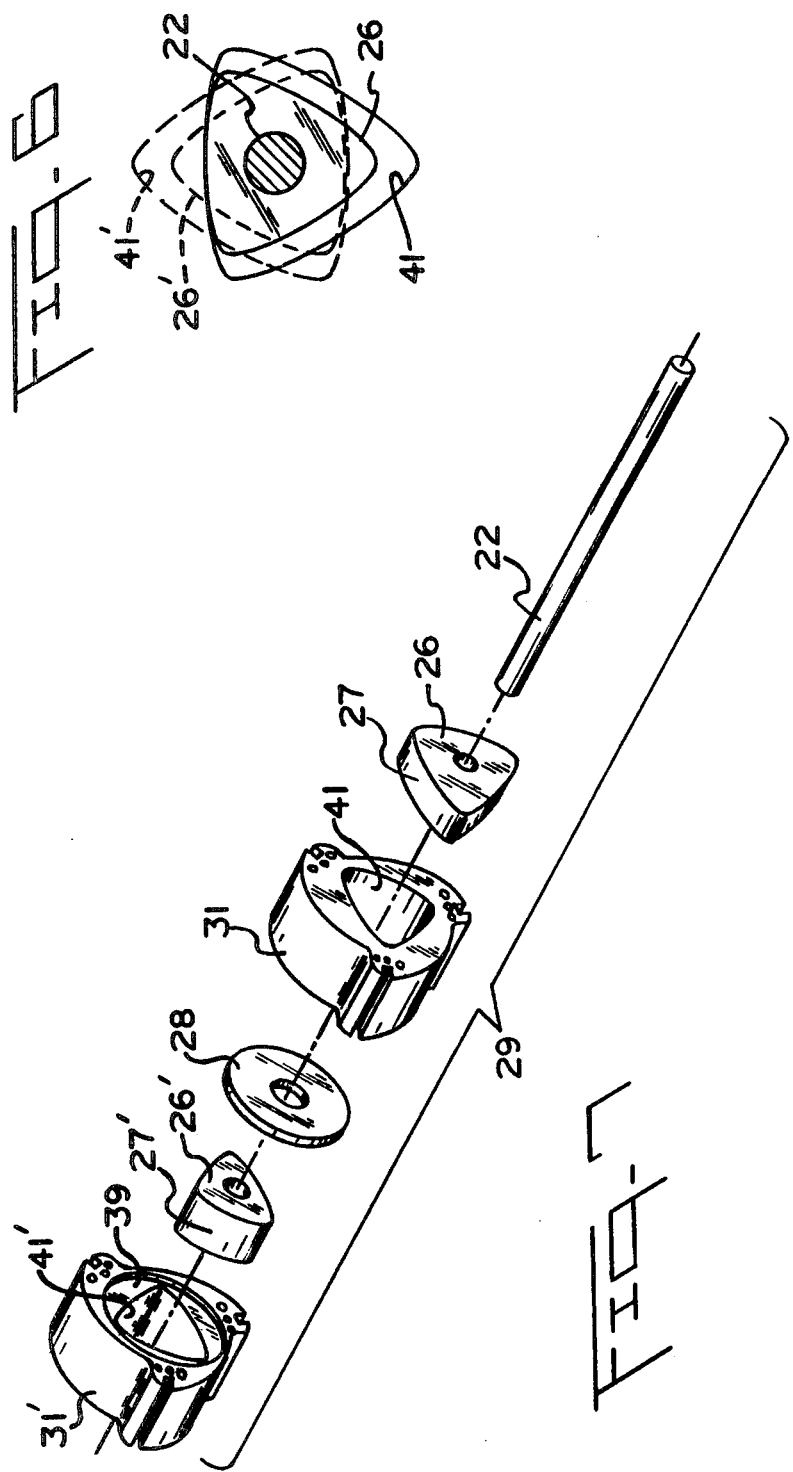

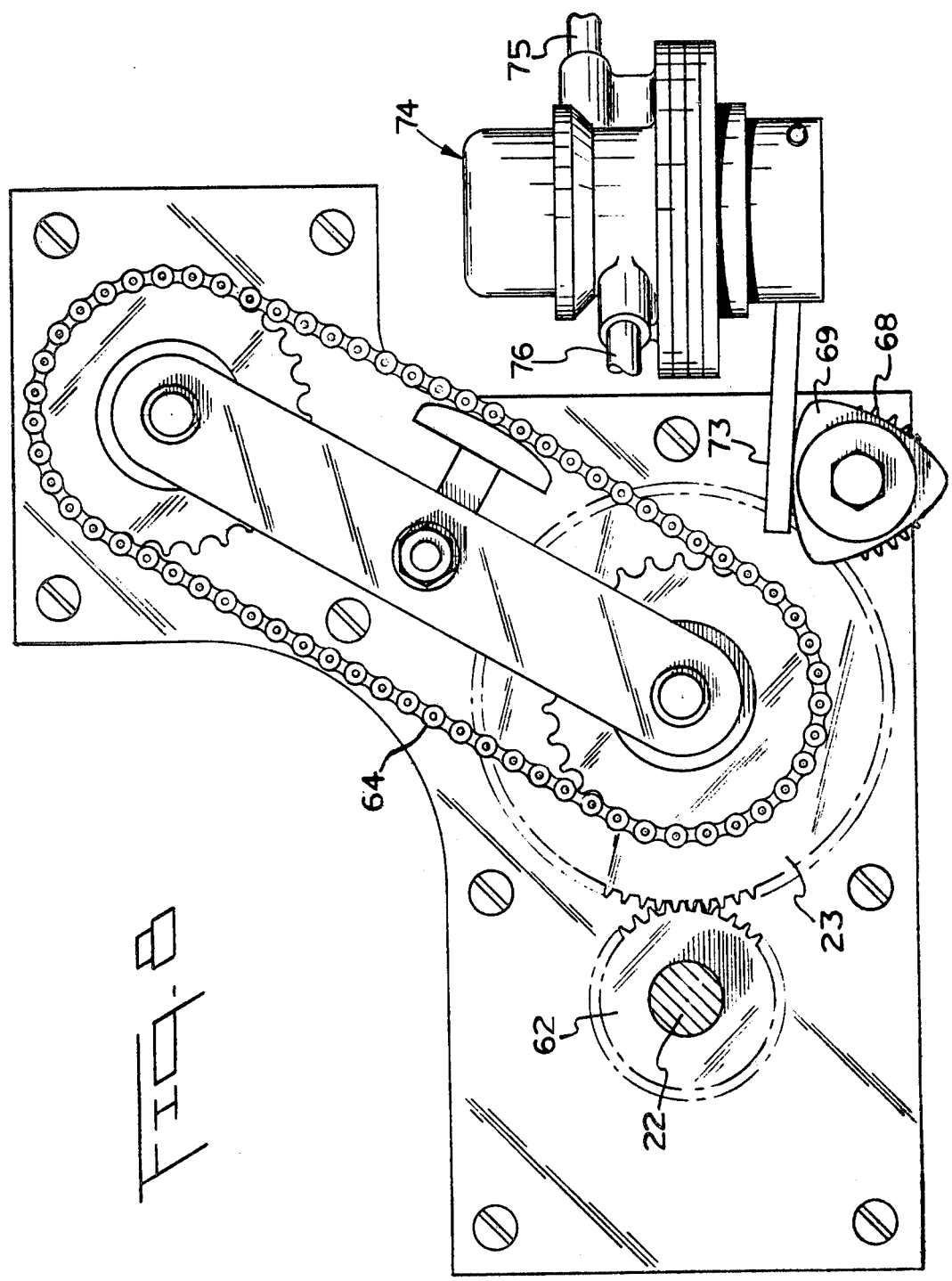

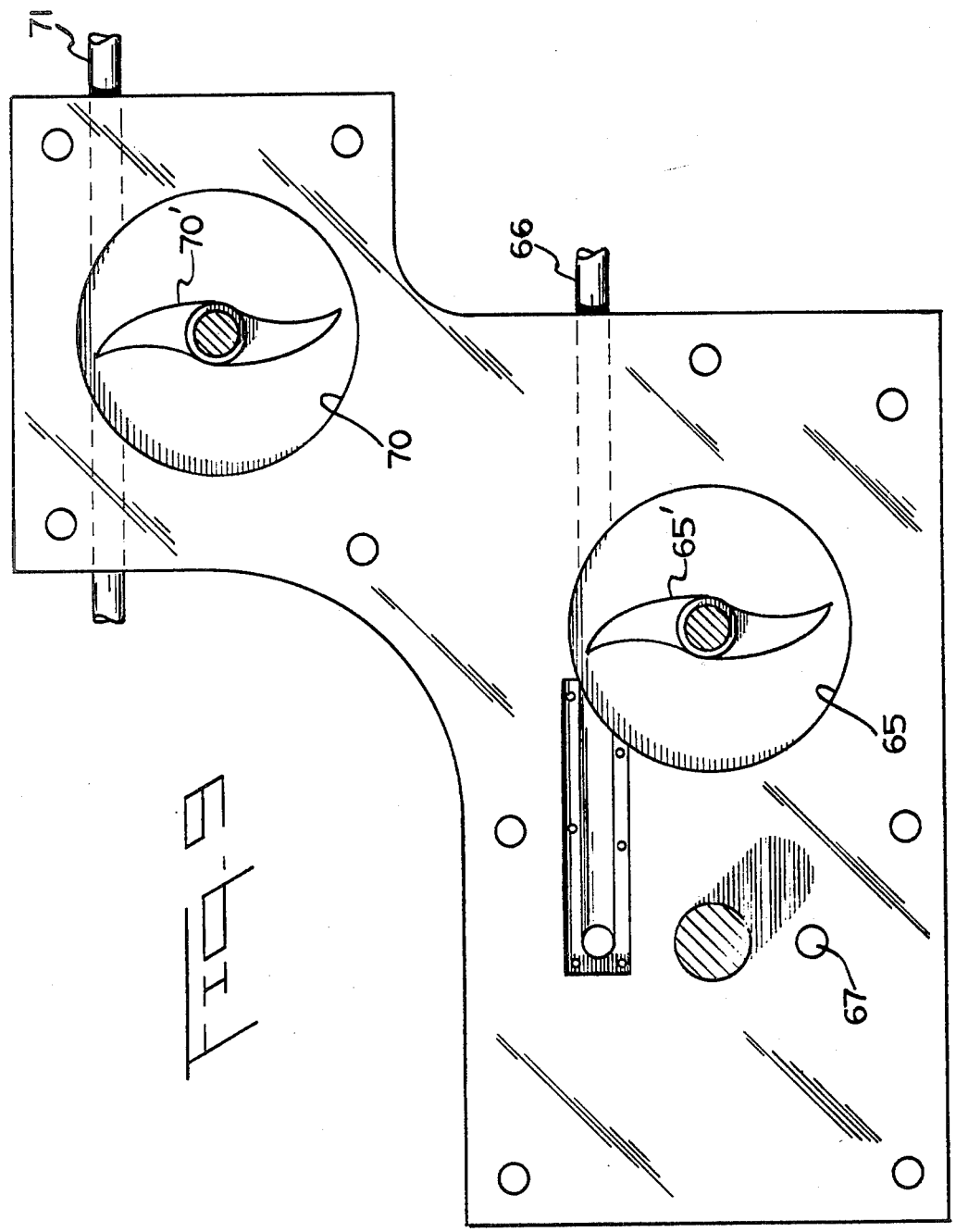

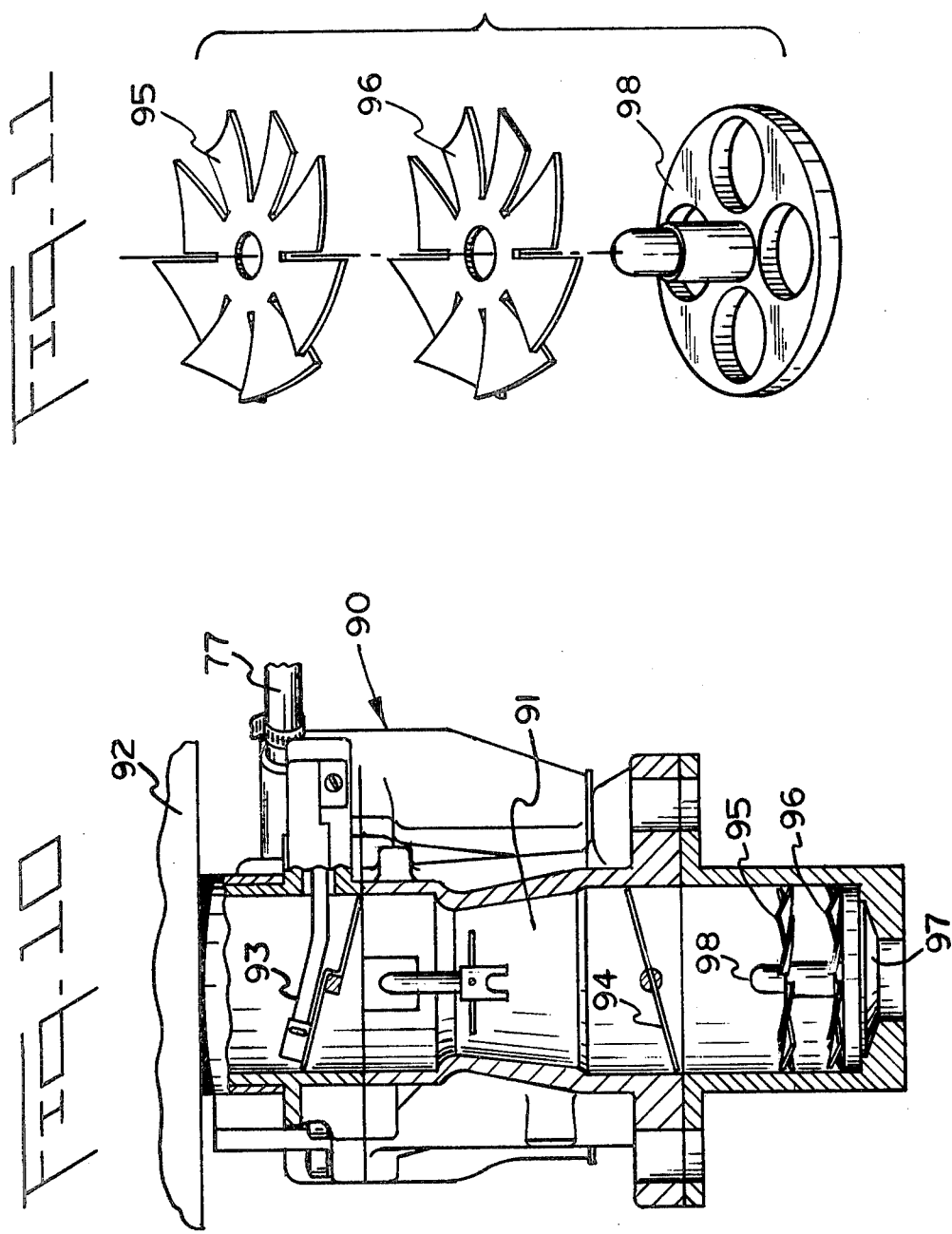

ROTARY INTERNAL COMBUSTION ENGINE

GENERAL BACKGROUND OF THE INVENTION

This application is a continuation-in-part of our application Ser. No. 749,642 filed Dec. 10, 1976 now U.S. Pat. No. 4,120,620.

This invention relates to improvements in internal combustion engines, and more particularly to an improved internal combustion engine which uses a three-sided rotor and which develops three power impulses per revolution, all in the same direction.

In U.S. Pat. No. 3,173,406 issued to Adolph A. Campos, there is disclosed a rotary internal combustion agent utilizing as its driving means an equilateral triangle shaped drive bar which is centered so that its axis coincides with the axis of the mainshaft. This bar corresponds with a triangular aperture in the rotor. This configuration gives a drive impulse for each sixty degrees of motion of the rotor. Although this is a generally efficient coupling, the motion lacks the smoothness of operation attained by the present invention which gives a substantially superior smooth flow of motion from each part of the rotation.

GENERAL PURPOSES AND OBJECTS OF THE INVENTION

A main object of the invention is to provide a novel and improved rotary internal combustion engine which is relatively simple in construction, which is compact in size, which is relatively light in weight and which develops a relatively high power output with minimum consumption of fuel.

A further object of the invention is to provide an improved rotary internal combustion engine of the type employing a three-sided rotor with improved lubricating and cooling systems, the engine being relatively inexpensive to manufacture, being durable in construction and involving only a few parts.

A still further object of the invention is to provide an improved rotary internal combustion engine which is relatively inexpensive to manufacture, which requires a relatively small amount of maintenance, which is reliable in operation, and which is economical in fuel consumption.

A still further object of the invention is to provide an improved rotary internal combustion engine of the type employing a three-sided rotor, the engine developing three power impulses per revolution, all in the same direction, said engine being smooth in operation.

A still further object is to provide such an improved rotary engine with an associated carburetor with empellors for providing a uniform flow of combustion mixture.

BRIEF DESCRIPTION OF THE DRAWINGS

FIG. 1 is a perspective view of an improved rotary internal combustion engine constructed in accordance with the present invention.

FIG. 2 is an enlarged vertical cross-section view taken substantially on the line 2—2 of FIG. 1.

FIG. 5 is a perspective view of the elements comprising the engine of FIGS. 1 to 4, said elements being shown in separated positions.

FIG. 6 is a cross sectional view of second type of drive element comprising duel triangular eccentrics.

FIG. 7 is a perspective view of the elements similar to FIG. 5 shown in separated position utilizing duel triangular eccentrics of FIG. 6 and corresponding chambers for receiving the eccentrics.

FIG. 8 is a perspective view of the side of the combustion engine showing a chain drive for the oil and water pumps and the drive mechanism for the fuel pump.

FIG. 9 is a perspective view similar to FIG. 8 except that the drive mechanism has been removed to show the water and oil inlet.

FIG. 10 is a cross sectional view of the carburetor of the engine shown in FIGS. 1 to 4.

FIG. 11 is a perspective view of the impeller fans shown in FIG. 10.

DETAILED DESCRIPTION OF THE INVENTION

Figure 3:
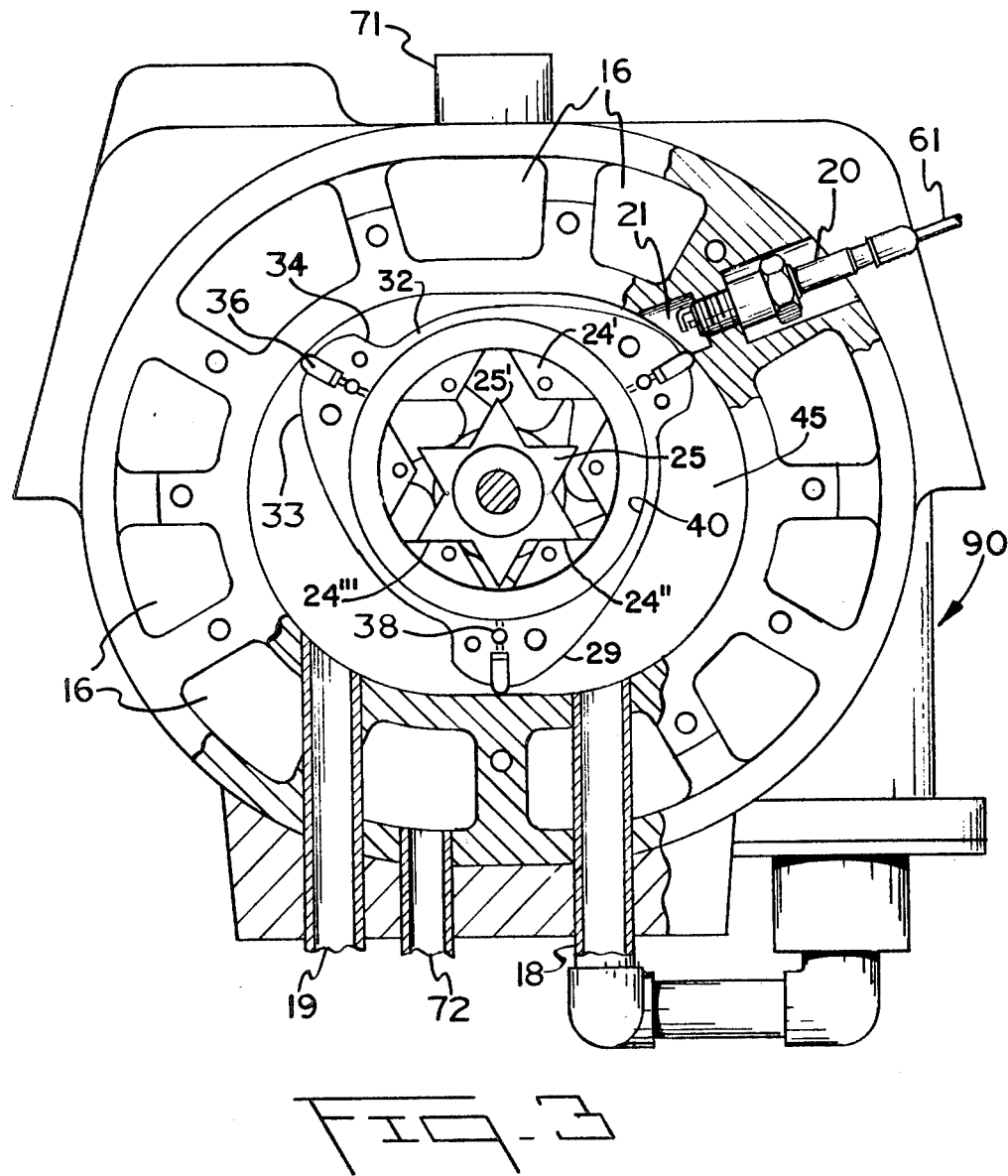
FIG. 3 is a vertical cross-sectional view taken substantially on the line 3—3 of FIG. 2.

Referring to the drawings, 11 generally designates an improved rotary combustion engine constructed in accordance with the present invention. The engine 11 comprises a main housing consisting of a generally annular main body 12 and a pair of opposite side plates 13 and 14 of similar shape secured to the opposite sides of the main body 12, as by means of longitudinally extending fastening bolts 15. The main body 12 is formed with a plurality of circularly arranged cooling slots some of which are indicated at 16, connected by chambers 16', whereby to provide continuous channels for the circulation of cooling liquid such as water, through the peripheral portions of the engine.

The engine is substantially flattened on one portion, as shown at 17, and the flattened portion 17 of the main body 12 of the engine is formed with a fuel intake port 18 to which is connected a fuel supply conduit, which in turn is connected to a carburetor generally indicated at 90 for a source of a combustible gas mixture. As shown in FIG. 1, the fuel intake port 18 is located at one side of the top wall of the engine. The engine is formed at its bottom wall with an exhaust port 19 which is located at the same side thereof as the fuel intake port 18.

Mounted in the wall of the main body 12 of the engine and angularly spaced from the fuel intake port 18 by an angle of approximately 90 in a counterclockwise direction, as viewed in FIG. 3, is a spark plug 20 whose electrodes terminate in an axial bore 21 forming an ignition space communicating with the interior of the engine, as shown in FIG. 3, for igniting fuel mixture in the upper portion of the engine cavity subsequent to compression thereof, as will be presently explained. The spark plug 20 is energized from a suitable ignition system generally indicated at 60, which is suitably synchronized so as to deliver a spark in the ignition space 21 near the end of the compression portion of the cycle of rotation of the engine rotor, as will be presently explained. The details of the distributor 60 with the connecting wire 61 and its associated ignition system for energizing the spark plug 20 are conventional in themselves and form no part of the invention.

Axially journaled in the engine is a mainshaft 22 which is rotably supported on suitable sleeve bearings 23 mounted in annular end bushings secured to the central portions of the side plates 13 and 14, as shown in FIGS. 2 to 5. At an intermediate portion of the mainshaft 22 is integrally formed with or has rigidly secured thereon a drive gear 25 in the form of a multi-pointed star with generally rounded points as indicated at 25', and which is centered so that the axis coincides with the axis of the shaft 22. This gear 25 can be an integral part of the shaft 22 or a separate piece secured thereto such as by keying. The whole drive gear area is provided with circulating oil from oil pump 65 thru inlet pipe 66 and outlet pipe 67.

The rotor 29 can be formed in one piece as seen in FIG. 5 or formed of two sections 31 and 31' as seen in FIG. 7 and is formed with three identical curved peripheral surfaces 32 which have trailing ends 33 of maximum radius and which diminish gradually in radius toward their leading ends. The radius reaches a minimum point adjacent the leading end of the side, after which the radius increases rapidly in value, defining an arcuately curved thrust shoulder 34 at the leading end of the peripheral surface 32 of the rotor.

The rotor 29 is formed at the junction between the leading and trailing ends of its respective sides 32 with radially extending longitudinal slots 35 in which are slidably positioned respective longitudinally extending sealing bars 36 which are biased outwardly into sealing contact with the inside wall of the cavity of body 17 by bowed leaf springs 37 disposed in the bottoms of the grooves or slots 35. Lubricating oil is forced into the area of the spring 37 through a feed hole 38 extending from the internal sections of the rotor in the mid-portion of each of the slots 35 to lubricate the bars 36. This forced lubrication is essential for smooth operation of the rotor. The oil is feed from a circulating oil pump 65. A ring of fiberous felt 59, 59' or the like is positioned in the internal section of the rotor to control the flow of oil to the sealing bars 36.

Circular ring members 43 and 44 are secured at the ends or either side of the main body 12 to close off the cooling slots 16. The cooling liquid is forced into these slots by water pump 70 which feed the cooling liquid through inlet conduit 71 and the cooling liquid is withdrawn through conduit 72. The cooling liquid is then passed through a radiator (not shown) for cooling the liquid. Water is the prefered cooling liquid.

Figure 4:
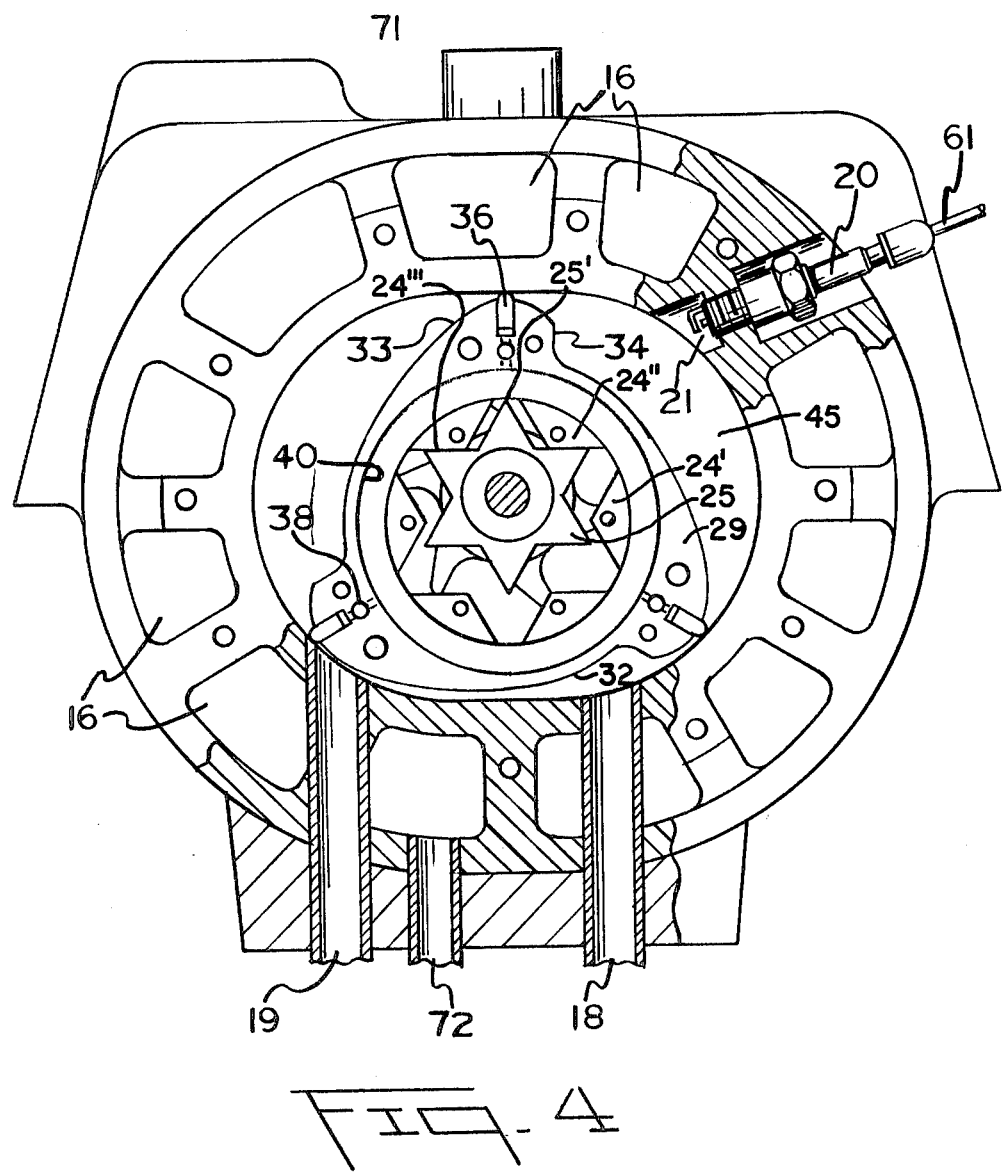
FIG. 4 is a vertical cross sectional view, similar to FIG. 3, but showing the rotor in a position wherein fuel is being admitted into the compression chamber of the engine, the rotor being in a position advanced relative to the position thereof shown in FIG. 3.

The rotor 29 is formed centrally with a circular aperture 40. A plate 24 fits into the circular aperture 40. The plate 24 has a centrally located multi-pointed star shaped aperture 24' to receive the gear 25 but which is substantially larger in size than the gear 25 received therein, but is of such size as to prevent complete rotation of gear 25 therein. As shown in FIG. 3 a substantial amount of clearance is provided between the faces of the gear 25 and inside faces of the aperture 24'. The rotor is also allowed to move somewhat horizontally and vertically relative to the shaft 22. The construction of the star-shaped aperture 24' is such that the gear 25 only contacts the aperture at two points 24" and 24"', on each side of common star points at any one time. As the rotor 29 revolves in an eccentric motion, it causes the star aperture 24' to contact successive adjacent points of the gear 25. Thus, the rotor 29 revolves in the eccentric motion within the engine cavity 45. The engine cavity 45 is an oval (semi-cylindrical) with its middle portions extending slightly inward to give the cavity an hour glass configuration. Because of this the diameter is least at the central portion of the cavity. The oval therefore has two opposed semi-cylindrical chambers. This configuration is clearly shown in FIGS. 3 and 4 wherein the cavity 45 is in a horizontal configuration. Thus, the cavity is shaped so as to be somewhat horizontally elongated, with a generally semi-cylindrical outer portions having convergent sides. Since there is some play between the star-shaped gear 25 and the inside faces of aperture 24' the rotor can assume a position, such as that shown in FIG. 4 wherein the center of the rotor has moved below the center of the shaft such that the distance from the center of the shaft to the lower seals 36 is slightly more than the distance to the lower seal, the differential in distance providing a surface in which combustion pressure in the space immediately to the right of said upper seal can act to produce rotations of the rotor. Because of the upward convergency of the sides of the upper portion of the cavity, as above noted, and as is shown in FIG. 3 and 4, the lower seal 36 act as follower members cooperating with said convergent sides to depress the rotor to the position of FIG. 4. This action causes the rotor to assume a depressed position providing a differential of radial distance between the center of the shaft 22 and the portion of the peripheral surfaces at opposite sides of the ignition 20.

In FIG. 8, the drive mechanism for the water pump 70 and oil pump 65 are shown. A gear 62 is secured to the main shaft 22 and drives a second gear 63 which in turn drives chain drive 64. The chain drive 64 drives the oil pump 65 and the water pump 70 causing the circulation of the oil and water in the engine. Gear 63 also drives a second small gear 68 which moves a generally triangular shaped gear 69. This latter gear rotates and causes a feeler arm 73 (pump actuator) to give a up and down motion to the fuel pump 74 causing the flow of fuel from line 75 to line leading to the carburetor 90.

In FIG. 9 the drive mechanism of FIG. 8 has been removed to show the pumps 65 and 70 with the associated impeller blades 65' and 70' which force the oil and water respectively through their respective systems.

The carburetor is shown in FIG. 10 and 11. The structure of the carburetor is conventional in most respects with the fuel and air being mixed in chamber 91. The air is drawn thru a conventional air filter 92 only partly shown in FIG. 10. The flow of air is controlled by butter fly valve 93 and damper 94. The novelty of the carburetor and what allows it to function advantageously with the rotary engine are two vertically aligned freely rotating imjeller blades 95 and 96 located at the base 97 of the carburetor. The impeller blades are supported on a stand 98 which fits into the base 97. The stand 98 is so constructed as to allow free movement of the blades so they can rotate. The passage of the air-fuel mixture over the impeller blades causes them to rotate in a plane perpendicular to the travel of the mixture. This rotation materially aids the uniformity of the mixture thereby allowing the smooth operation of the engine.

A second modification of the device is shown in FIGS. 6 and 7. As indicated above the rotor 29 be formed of two sections 31, 31'. The aperature in each section of the rotor is triangular in shape but offset from one another so that when the two sections are secured together the internal aperture has a star shaped configuration. In this modification the intermediate portion of the mainshaft 22 is integrally formed with, or has rigidly secured thereto, two gears or cams 26 and 26' generally triangular in shape which have slightly convex sides 27 and 27' and which are centered so that each axis coincides with the axis of the shaft 22. These gears can be an integral part of the shaft 22 or a separate piece secured thereto such as by keying. A spacer disk 28 separates these two gears from one another and is for the purpose of keeping the rotation steady so the same pressure is exerted on each gear. The spacer disc 28 is allowed to rotate freely about the shaft and is recessed into rotor portion 31. The rotor 29 is formed centrally with a triangular aperature 41 and 41' in each section 31 and 31' which is in the shape of an equilateral triangular the gear 26, 26' are received therein, but are of such size as to prevent complete rotation of each gear therein. A substantial amount of clearance is provided between the faces of the body and inside faces of the aperture.

DESCRIPTION OF OPERATION

In operation, combustible fuel mixture is admitted into the space 46 of the engine, assuming the port 18 to be in communication with the space, 46 namely, the rotor to be in a position such as that illustrated in FIG. 3. With the rotor rotating in a counterclockwise direction, as viewed in FIG. 3, the lower sealing bar 36 eventually passes beyond the intake port 18, namely passes the position thereof illustrated in FIG. 3, after which the gaseous fuel mixture admitted into the space 46 undergoes compression as the volume thereof is reduced, namely, as the rotor rotates beyond the position thereof illustrated in FIG. 4. When the rotor is in the position shown in FIG. 3, the fuel in the upper space and is under maximum compression, at which point ignition takes place, and the fuel is ignited by the spark plug 20. The expansion of the ignited fuel develops a power stroke on the aforesaid differential surface. As above mentioned, the rotor is urged to the depressed position of FIG. 4 by the cooperation of the seals 36 with the convergent sides of the cavity. Therefore, the rotor will receive a power impulse tending to rotate the rotor with each ignition of the compressed fuel by the spark plug 20. The power impulse will be furnished by the expanding gaseous products of combustion acting against the aforesaid differential surface.

Subsequent to the delivery of the power impulse to the rotor, the gaseous products of combustion are placed in communication with the exhaust port 19, through which they discharge to the atmosphere. Thus, in the position of the rotor shown in FIG. 3, the gaseous products of combustion in the lower space on the left of the engine cavity are placed in communication with the discharge port 19, and are allowed to escape, after delivery of the thrust impulse to the rotor. The above described cycle is repeated three times for every revolution of the rotor, so that three power impulses are developed for each revolution thereof.

Following impulses applied to the rotor are transmitted to the shaft 22 through the resilient coupling defined between the star-shaped gear 25 and the star-shaped aperture 24 in the rotor which permit relative movements between rotor 29 respectively and the portions 25 and 24 in the manner above described.

It will be noted that the respective sides of the star-shaped aperture 24 in the rotor are substantially parallel to the sides of the rotor, namely, to the surfaces defined between respective pairs of contact bars 36, 36. Thus, when the gas mixture is ignited in the compressed space, the resultant explosion develops a force which may be resolved in a direction perpendicular to the adjacent straight side of apertures 24 of the rotor, causing the rotor to be urged toward the corresponding contact points 24'', 24' of the aperture 24 and gear 25.

In the configuration of FIGS. 6 and 7 following impulses applied to the rotor are transmitted to the shaft 22 through the resilient coupling defined between the dual triangular shaft portions 26 and 26' and the dual triangular aperature 41 and 41', offset from one another to form a multi-sided star configuration, in the rotor which permit relative movement between rotor 31 and 31' respectively and the portions 26 and 26' in the manner above described.

While a specific embodiment of an improved rotary combustion engine has been disclosed in the foregoing description, it will be understood that various modifications within the scope of the invention may occur to those skilled in the art. Therefore, it is intended that no limitations be placed on the invention except as defined by the scope of the following claims.

What is claimed is:

1. In a rotary combustion engine comprising a main housing formed with a generally oval (vertically) horizontally elongated rotor cavity with the middle portion extending slightly inwardly comprising two substantially semi-cylindrical opposed chambers (lower portion, an arcuate top portion at a radial distance from the center of said lower portion greater than the radius of said lower portion, and arcuate upwardly convergent side portions smoothly connecting said arcuate top portion and substantially semi-cylindrical lower portion,) said cavity having a fuel intake port communicating with the cavity at one side of said top portion, fuel ignition means in the cavity adjacent the opposite side of said top portion, said cavity being provided with a peripheral exhaust port in said lower portion at the same side of the cavity as said intake port, a shaft journaled in the housing with its axis displaced from center toward said arcuate top portion, a rotor having a periphery comprising three successive sides of similar shape, means for supporting said rotor on said shaft and respective sealing members on the periphery of said rotor between its successive sides sealing engaging the peripheral surface of said rotor cavity and cooperating with said convergent side portions to cause the rotor to at times assume a depressed position providing a differential of radial distance between the center of the shaft and the portion of said peripheral surface at opposite sides of the ignition means engaged by two successive sealing members whereby to define a differential surface on which combustion pressure in the space immediate adjacent to one of said sealing members to provide a thrust on the rotor, the improvement which comprises utilizing as said means for supporting said rotor on said shaft a shaft having a six-sided star-shaped gear and utilizing as said rotor twin sections each having a circular aperture, a plate positioned in said circular aperature having a six-sided star-shaped aperature and loosely receiving said star-shaped gear so that said gear can not rotate in said star-shaped aperature, and wherein said rotor is connected to means for circulating oil within the rotor, and passage means for delivering the oil to and from the interior of said rotor to said sealing means wherein said passage means comprises a feeding channel extending from the internal portion of the rotor to said sealing means and a fiberous felt band extending around said interior portion of said rotor covering said feed channel to meter the flow of oil to said sealing means.

* * * * *